United States Patent Office 3,137,292
Patented June 16, 1964

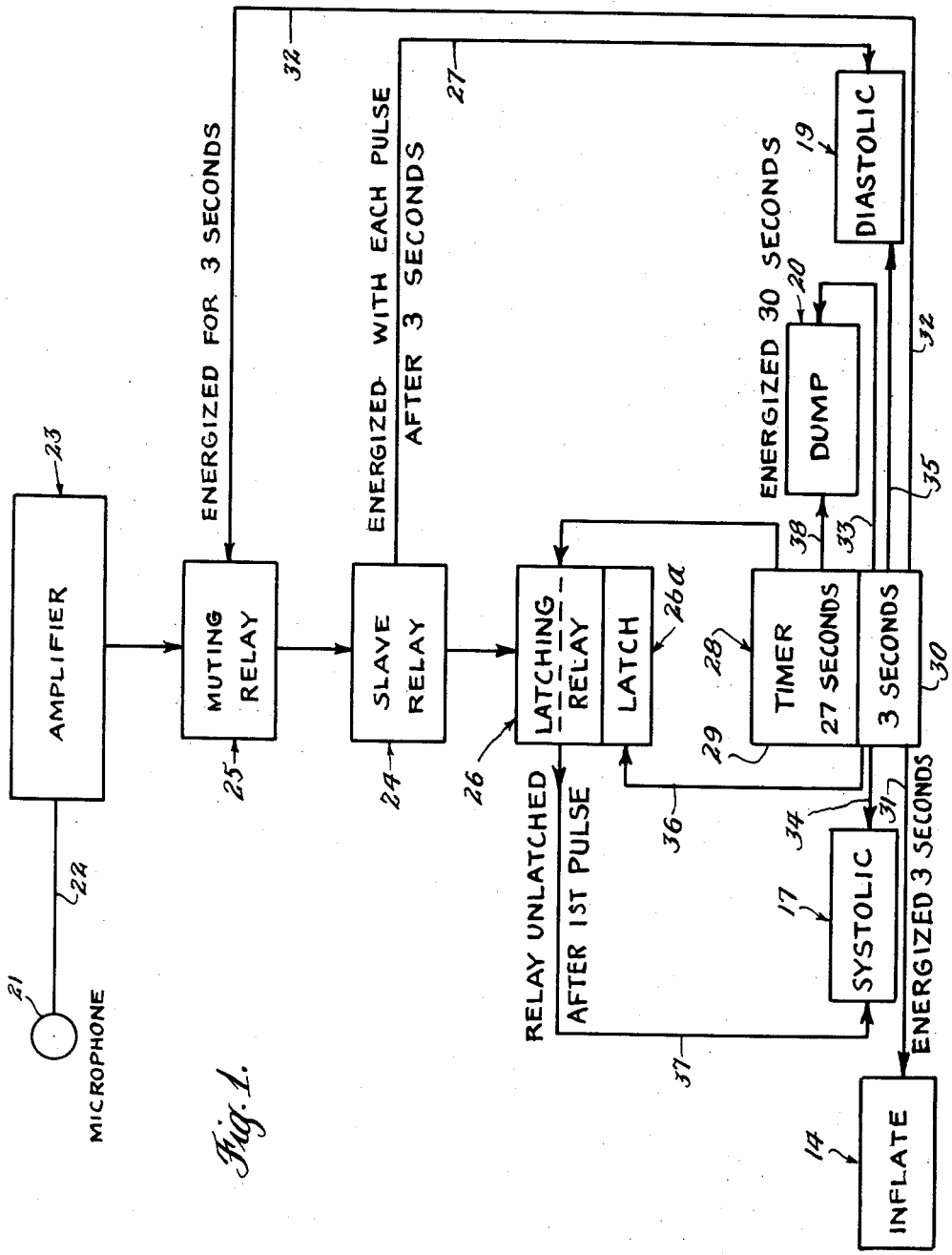

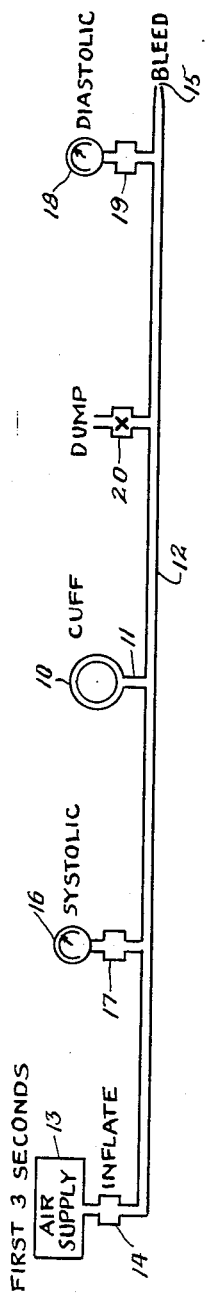
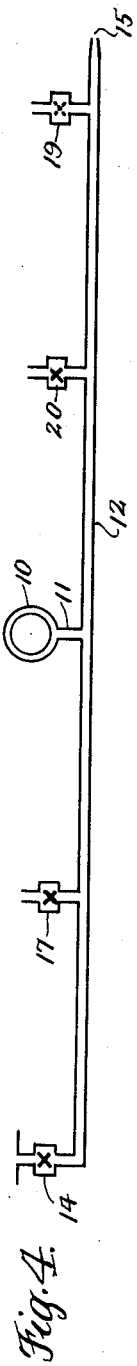
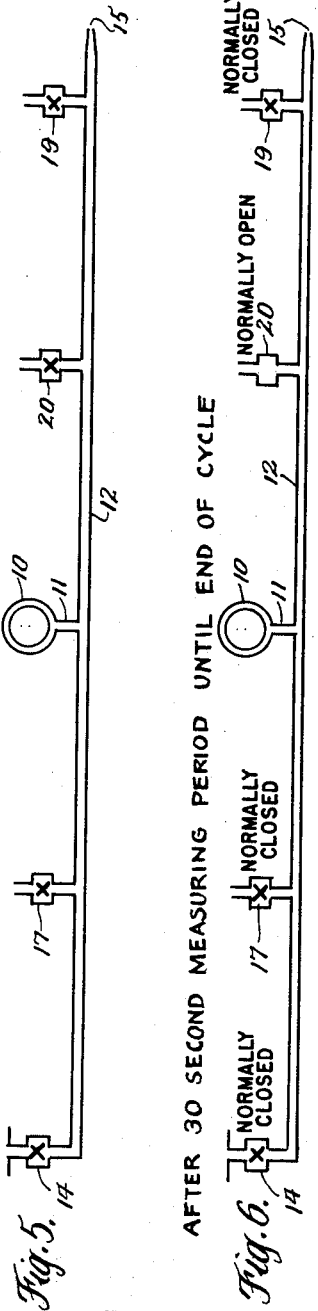

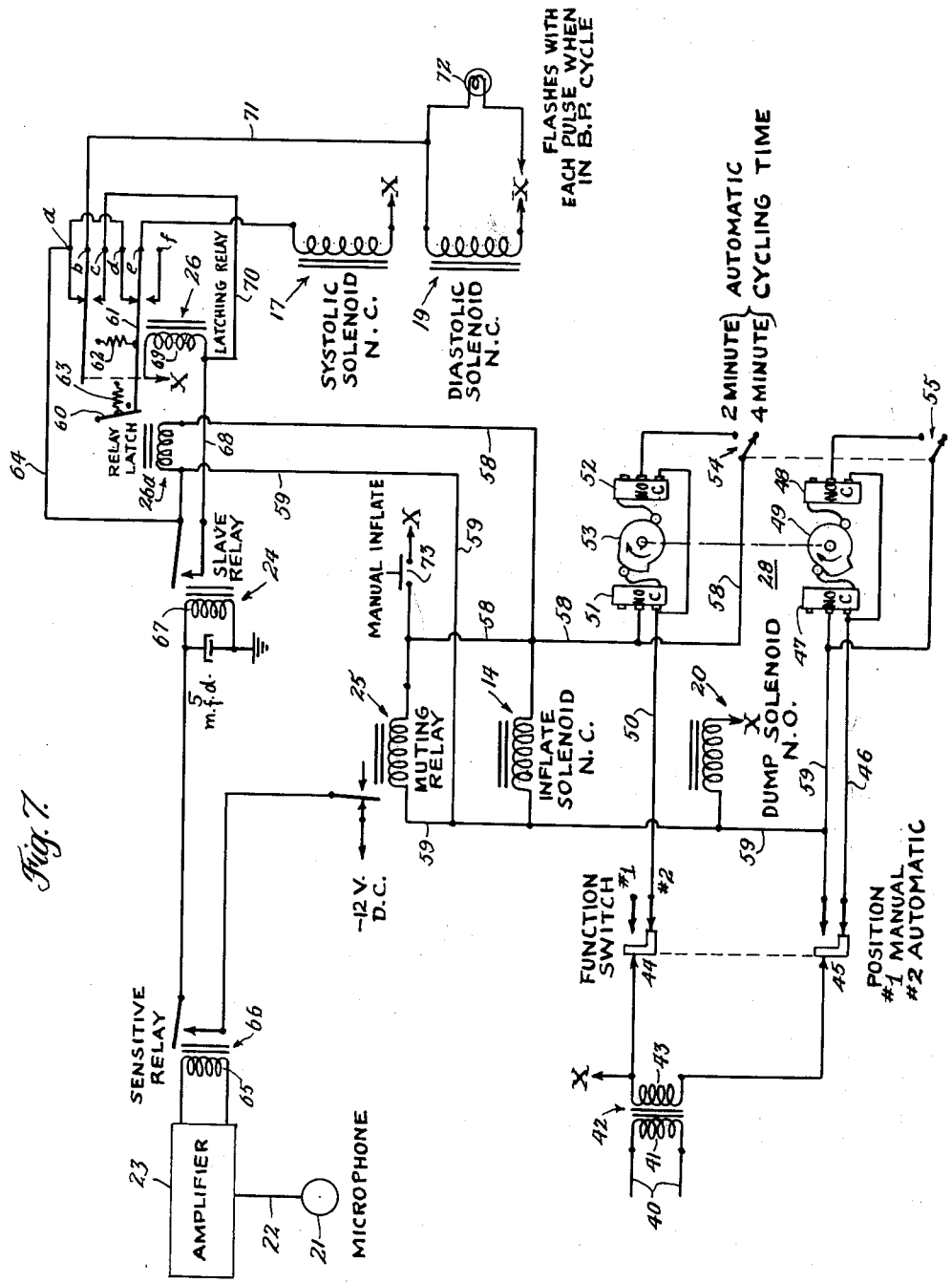

3,137,292
BLOOD PRESSURE APPARATUS
Harold Kenneth Richter, Willow Grove, and James O. W. Shoemaker, Glenside, Pa., assignors to Air-Shields, Inc., Hatboro, Pa., a corporation of Delaware
Filed Dec. 9, 1960, Ser. No. 74,817
7 Claims. (Cl. 128—2.05)

This invention relates to apparatus for measuring blood pressure, and is particularly concerned with apparatus for repetitive measurement of both systolic and diastolic blood pressure.

The conventional clinical method of measuring blood pressure involves restricting arterial flow by varying an external fluid pressure applied to an artery, and observing by means of a stethoscope the resulting changes in arterial sounds at a point more remote from the heart than the point of pressure application.

Generally, the applied pressure is first raised to a value above the highest blood pressure which is expected to be encountered. The flow of blood through the artery is thus completely terminated, and no sound is heard on the stethoscope.

The pressure is then slowly decreased and a value is reached at which the heart is able to pump blood in small spurts through the constriction. The onset of this condition is indicated by the first of a series of pulses audible in the stethoscope. The pressure applied at the first audible pulse is called the systolic pressure, and represents the peak pressure developed by the heart on each beat.

As the pressure is further reduced, blood passes through the constriction during a longer portion of each beat. Since the periods of flow are still separated by an interval during which no blood flows, audible pulses continue at the point of observation.

The intervals of silence between periods of blood flow become shorter and shorter until a continuous flow of blood passes through the restriction. The onset of this condition is indicated by the cessation of an audible pulse; and the pressure applied to the artery when the last pulse is heard is called the diastolic pressure.

Conventionally, the foregoing method is performed with apparatus which consists of an inflatable cuff adapted to surround the patient's limb, a rubber bulb for inflating the cuff, a valve for controllably bleeding air from the cuff, a manometer for indicating the air pressure in the cuff, and a stethoscope which is used to determine the presence or absence of pulse at a point more remote from the heart than the cuff.

The conventional method and apparatus require that a trained person manipulate the apparatus and record the results whenever blood pressure information is desired.

An important object of the invention is the provision of blood pressure measuring apparatus capable of automatic measurement of blood pressure responsive to a control signal and even without manipulation or observation by an operator. Further, an object is the provision of such apparatus for so measuring both systolic and diastolic blood pressure.

Another object of the invention is the provision of apparatus of the kind mentioned which can be permanently associated with the body of a patient, either proximately or remotely, and operated either automatically in accordance with a pre-established time schedule, or semi-automatically in response to the manipulation of a control, which again may be located close to or remote from the patient.

The apparatus of the invention has the further capability and object of recording the last blood pressure observation so that this information is available until the time of the next succeeding operation of the apparatus.

Still further, it is an important object of the invention to provide blood pressure measuring apparatus having the foregoing capabilities and, in addition, embodying the reliability, simplicity and flexibility which are required in clinical apparatus.

How the foregoing and other objects of the invention are attained will be more fully understood upon reference to the description which follows and to the drawings in which:

FIG. 1 is a schematic diagram of apparatus constructed in accordance with the invention;

FIGS. 2 to 6 are diagrammatic indications of the conditions of the several valves of the apparatus during each of five phases of operation of the apparatus; and FIG. 7 is a wiring diagram of the circuit employed in the invention.

The apparatus includes a cuff 10, which may be of conventional construction, connected by a flexible tube 11 to a fluid manifold 12. The fluid manifold is adapted to be charged with a fluid, for example, air, from a fluid supply system 13 through a normally closed solenoid controlled valve 14. Manifold 12 is provided with a bleed orifice 15, which is so proportioned as to allow fluid to bleed from the system when the valve 14 is closed at a rate which is appropriate for the observation of changes in blood sounds as the pressure passes through the systolic and diastolic valves. Bleed times of the order of ten seconds are appropriate.

A systolic pressure gauge 16 is connected to manifold 12 by a normally closed solenoid controlled valve 17, and a diastolic pressure gauge 18 is connected to the pressure manifold by a normally closed solenoid controlled valve 19. A normally open solenoid controlled dump valve 20 provides for the rapid deflation of cuff 10 when the measuring cycle has been completed.

It will be seen that if dump valve 20 is closed and inflate valve 14 is opened to connect manifold 12 to the air supply, the manifold and the cuff will be subjected to the pressure of air supply 13; and it will further be seen that if valves 17 and 19 are open, gauges 16 and 18 will indicate the fluid pressure in cuff 10. If inflate valve 14 is now closed, the air in the cuff and manifold will bleed off through bleed opening 15 and the indicating needles on gauges 16 and 18 will slowly move towards zero.

The apparatus also includes a microphone 21 adapted to be placed in transducing relationship to an artery of the patient in a position distal to cuff 10, and connected by a flexible lead 22 to an amplifier 23. Amplifier 23 raises the signal produced by the microphone to a level appropriate for the operation of a relay, and may also include filter and other means to modify the microphone output signal so as to improve its relay actuating characteristics. For example, high frequency components may be eliminated and the pulsations at heart beat frequency may be augmented to be sure that a relay driven by the amplifier will faithfully follow the pulsations of the heart without bounce or chatter.

The output of the amplifier is fed to a slave relay 24, except when a muting relay 25 is energized to prevent the application of the amplifier output signal to the slave relay. The output of the slave relay, which consists of a series of bursts of electrical energy repeated at a rate equal to the pulse repetition rate translated by the microphone, is fed to and controls the operation of the normally closed solenoid control valves 17 and 19 which respectively connect systolic and diastolic pressure gauges 16 and 18 to manifold 12.

In simplified outline the measuring operation is accomplished as follows:

The pressure in the cuff is raised to a level above the suspected systolic pressure and then begins to fall at a rate determined by bleed orifice 15. The systolic valve 17 is open and systolic gauge 16 indicates the pressure in the cuff. The diastolic valve is also open so that the air pressure within the diastolic gauge 18 is equal to the pressure in the cuff.

When the pressure has fallen far enough for the first pulse to appear at the location of microphone 21, slave relay 24 releases a first pulse of energy which energizes latching relay 26, thus breaking a normally closed contact which up until that point had been in series with the circuit of systolic solenoid controlled valve 17. As a result, valve 17 now closes, and gauge 16 indicates and will continue to indicate, until the cycle is repeated, the systolic blood pressure of the patient. Relay latch 26a prevents latching relay 26 from being restored to the normal condition, and thus prevents the circuit to systolic solenoid controlled valve 17 from being opened again during the measuring cycle.

At the same time, responsive to the first pulse sensed by the microphone, slave relay 24 energizes latching relay 26 closing the diastolic solenoid valve 19 so that the pressure within gauge 18 corresponds to the pressure within the manifold 12 at the time the first pulse is received. Valve 19 remains closed until the next pulse of energy is delivered by slave relay 24 over line 27. It will be seen, therefore, that each succeeding pulse causes a momentary opening of valve 19 and thereby causes gauge 18 to register a new—and lower—pressure each time a pulse is sensed by the microphone. When the pressure in cuff 10 falls so low that pulses are no longer sensed by microphone 21, diastolic gauge 18 is not again connected to manifold 12, and it therefore continues to indicate the pressure which existed in cuff 10 when the last pulse was sensed, i.e., it indicates the diastolic blood pressure of the patient. The condition with valves 14, 17 and 19 closed and with valve 20 open may be considered as the "normal" condition, and this is indicated by the legends applied to those valves in FIGURE 2.

It will be seen from the foregoing that during the actual measuring period the connection of each of the two gauges to the cuff is controlled by an electrical signal corresponding to a pulse appearing at the position of microphone 21, and that, in addition, the systolic gauge is controlled in such a way that it continues to indicate the pressure existing at the moment when the first pulse was translated, while the diastolic gauge is controlled so that it indicates and continues to indicate the pressure at the moment when the last pulse was translated.

In addition to the elements so far discussed, the invention may advantageously include a timer mechanism for controlling the initial inflation of the cuff, the final dumping of fluid from the pressure system, and equalization of the pressure within the two gauges with that in the cuff at the beginning of the measuring cycle.

In FIG. 1 the timer 28 is indicated schematically by two blocks 29 and 30 respectively labeled 3 seconds and 27 seconds, each block representing a group of timer contacts active respectively during the first three seconds of the operation of the device and the ensuing twenty-seven seconds. As will be seen the active cycle of thirty seconds is repeated at some predetermined interval. In the embodiment illustrated in FIG. 7, for example, the time between the initiation of one measuring cycle and the next may be controllably set for either two minutes or four minutes.

A complete automatic measuring cycle will now be described with reference to FIGS. 1 to 6. At the instant the cycle begins the timer, through its three-second contacts, (a) energizes inflate solenoid controlled valve 14 through line 31, to connect the air supply 13 to manifold 12; (b) energizes muting relay 25 through line 32 to prevent the translation of signals from amplifier 23 to slave relay 24 during the inflation period; (c) energizes normally open dump valve 20 through line 33 to close the dump valve; (d) energizes normally closed valve 17 through line 34 to open the valve and allow the pressure in systolic gauge 16 to rise with the rise in pressure in cuff 10; (e) similarly energizes normally closed diastolic solenoid control valve 19 through line 35 to similarly enable diastolic gauge 18 to be charged with the pressure of manifold 12; and (f) energizes latch 26a through line 36 to allow the armature of latching relay 26 to move to its normal position. The conditions of the four solenoid controlled valves during the first three seconds are illustrated in FIG. 2, from which it will be seen that air supply solenoid 14 and systolic and diastolic valves 17 and 19 are all open and dump valve 20 is closed, as indicated by the symbol "X."

At the end of the three second inflation cycle, the condition of the soleniod valves is as indicated in FIG. 3, i.e., inflate valve 14 is no longer energized and is therefore closed, systolic valve 17 is energized through normally closed contacts of latching relay 26, which is de-energized, dump valve 20 is closed, and diastolic valve 19 is open. In addition, muting relay 25 is in conducting condition, and latch 26a is in condition to engage the armature of latching relay 26 when the latter is energized, i.e., when the first pulse is translated by slave relay 25 latching relay 26 is energized momentarily and is held in energized position by latch 26a, with the result that the energizing current to systolic valve 17 over line 37 is interrupted, so that systolic gauge 16 is disconnected from the manifold 12 and indicates the pressure existing in manifold 12 at the moment the first pulse was translated. At the same time, the first pulse also closed diastolic solenoid valve 19, so that diastolic gauge 18 also indicates, the systolic pressure until the next pulse is received.

The condition after the first pulse has occurred and until the diastolic pressure is reached is illustrated in FIG. 4, in which it will be seen that the inflate and dump valves remain closed, the systolic valve is closed and the diastolic valve is opening with each pulse. As the pressure continues to fall it ultimately reaches a level so that no pulse is translated by the microphone, and diastolic valve 19 stops cycling.

The condition in which all of the solenoid controlled valves are closed is illustrated in FIG. 5, and continues until the end of the thirty second measuring period.

At the end of the thirty second measuring period, dump valve 20 is opened by a signal from the twenty-seven second section 30 of timer 28 over line 38; the condition of the valves after this event has occurred is indicated in FIG. 6, and this may be considered the "normal" condition of the apparatus. This condition persists until the measuring cycle is once again instituted, either at the end of the period determined by the timer or by a manual control not illustrated in FIGS. 1 through 6 but included in FIG. 7.

FIG. 7 is a wiring diagram of blood pressure measuring apparatus constructed in accordance with the invention. The diagram includes and identifies by identical numbers some of the principal elements illustrated in FIGURES 1 and 2. For simplicity, we have indicated the electrical interconnection of various parts to a point of common potential by connection to a point represented by the letter "X." Electrical energy is supplied to the circuit from power mains 40, which are connected to the primary 41 of a power transformer 42, whose secondary 43 delivers current at 12 volts.

Low voltage current from transformer 42 flows through the two sections 44 and 45 of a function switch, which converts the apparatus from manual operation (switch position 1) to automatic operation (switch position 2). When the function switch is adjusted for automatic operation, current passes along line 46 to the common terminals c of a pair of microswitches 47 and 48, which are positioned to be closed by a cam 49 which forms a part of timer 28. The other side of the low-voltage power supply is connected by line 50 to the common terminals c of a second pair of micro-switches 51 and 52, similarly associated with a cam 53 which is mounted on the same shaft as cam 49. Cams 49 and 53 are proportioned so that their associated switches are closed for thirty seconds and open for three and a half minutes.

A cycle-adjusting switch having two sections, 54 and 55, is provided so that the apparatus may be adjusted to repeat the measuring cycle either at two-minute or four-minute intervals. It will be understood, of course, that other time intervals may be provided for by appropriate proportioning of the timer mechanism. In any case, with the cycle time-adjusting switch in the open, or four minute, position as illustrated in FIG. 7, switches 48 and 52 are out of the circuit and the operation can be described with reference to switches 47 and 51 only.

It will be observed that cams 49 and 53 are mounted on their common shaft so that their profiles are rotationally displaced from one another. The displacement amounts to twenty-seven seconds, and accordingly switch 51 will both close and open twenty-seven seconds sooner than switch 47.

The description of the operation of the apparatus which follows begins with switch 51 closed, so that line 50 is connected to line 58, which, in turn, is connected to the right-hand end of inflate solenoid 14, muting relay 25 and relay latch 26a.

When, twenty-seven seconds after the closing of switch 51, switch 47 is actuated to connect line 46 to line 59, it completes the circuit to dump solenoid 20, whose right-hand terminal is connected to common point "X," and also completes the circuit to the left-hand ends of inflate solenoid 14, muting relay 25, and relay latch 26a, all of whose right-hand ends, as we have seen, have been connected to the power supply by switch 51. The twenty-seven second lead of switch 51 will cause the de-energization of the inflate solenoid, muting relay and relay latch three seconds after their energization, since switch 51 will open three seconds after switch 47 closed. However, dump solenoid 20 will remain energized for the full thirty seconds that switch 47 is closed, since the dump solenoid is not in the circuit of switch 51.

During the three seconds when both switch 47 and switch 51 are closed, armature 60 of relay latch 26a is withdrawn from engagement with armature 61 of relay 26, so that armature 61 can be drawn to its de-energized position by spring 62, after which, upon de-energization of relay latch 26a, latch armature 60 is drawn to the active position by its spring 63, ready to latch armature 61 in its energized position as soon as relay 26 is energized.

Turning now to systolic solenoid 17, it will be seen that, at the end of the three second period, energy will be supplied to solenoid 17 from line 59 through line 64 and normally closed contacts d and e of relay 26. Similarly, energy will be supplied to diastolic solenoid 19 from line 64 through normally closed relay contacts a and b. Hence, during the three second interval, both gauges will be connected to the cuff.

Now when microphone 21 translates the first pulse, an amplifier output signal corresponding thereto will be applied to the winding 65 of sensitive relay 66, which is arranged to apply 12 volts D.C. to the winding 67 of slave relay 24 if muting relay 25 is in de-energized condition, as it is after switch 51 opens. Slave relay 24, in turn, connects line 59 to line 68 each time a pulse is translated by microphone 21, thus energizing winding 69 of relay 26. The first time relay 26 is energized, armature 61 is drawn downwardly as viewed in FIG. 7, and, during the rest of the measuring cycle, held there by latch 60. The shifting of armature 61 breaks the circuit from line 64 through contacts d and e to systolic solenoid 17, so that systolic gauge 16 is isolated from the pressure system for the remainder of the measuring cycle, and continues to indicate the pressure at the moment the first pulse was sensed. The second and each succeeding pulse of slave relay 24 effect interconnection of line 59 to line 68 as before. Line 68 is connected to line 70, which is in turn connected to relay contact c, which is now in engagement with relay contact b, which is connected to diastolic solenoid by line 71. Accordingly, each pulse translated by microphone 21 results in the application of a burst of energy to diastolic solenoid 19, momentarily opening the valve connecting diastolic gauge 18 with the pressure system, so that diastolic gauge 18 always indicates the pressure in the system at the time the last pulse was translated. When the microphone ceases to translate further pulses, diastolic gauge 18 continues to display the value of the pressure at the time of the last pulse, i.e., the diastolic blood pressure.

A bulb 72 is connected across diastolic solenoid 19, and, by flashing on each blood pressure cycle, indicates that the apparatus is at a point between the measurement of the systolic and diastolic pressures.

Returning to the cycle adjusting switch, it will be seen that when switch sections 54 and 55 are closed, switches 48 and 52 will be placed in parallel with switches 47 and 51 respectively; and that since switches 48 and 52 are actuated by cams 49 and 53 at points 180° from the points of actuation of switches 47 and 51, the apparatus will effect two measuring cycles per four minute period rather than one as described above.

The apparatus is also capable of semi-automatic operation, i.e., the measuring cycle can be initiated at will, regardless of the position of timer cams 49 and 53.

Such operation is effected by first shifting function switch sections 44 and 45 to the manual or No. 1 position. This applies energy to line 59, immediately energizing dump solenoid 20, and also energizing the left-hand ends of inflate solenoid 14, muting relay 25, and relay latch 26a. Manual inflate button 73 is now depressed, energizing the right-hand ends of inflate solenoid 14, muting relay 25, and relay latch 26a. The inflate button is held down long enough to permit the pressure system to inflate, and then released. After inflate button 73 has been released the operation of the apparatus proceeds in exactly the same manner as described above.

We claim:

1. Blood pressure measuring apparatus comprising a pressure cuff adapted to be wrapped about a limb and to be distended to restrict the flow of blood therethrough, means for reducing the distention of said cuff, transducer means responsive to the presence of a pulse at a point on such limb more remote from the heart than the location of said cuff, systolic pressure sensing means connectible to said cuff, circuit means responsive to the translation of a pulse by said transducer means to disconnect said systolic pressure sensing means from said cuff and prevent the reconnection thereof for a predetermined period, diastolic pressure sensing means connectible to said cuff, and second circuit means responsive to the translation of a pulse by said transducer means to connect said diastolic pressure sensing means to said cuff each time said transducer means responds to a pulse.

2. Apparatus for measuring blood pressure comprising a limb surrounding cuff, a source of fluid under pressure, normally closed controllable means for connecting the cuff to the source, first indicating means for indicating systolic pressure, second indicating means for indicating diastolic pressure, means for bleeding fluid from said cuff at a rate less than the rate at which fluid is supplied to said cuff by said supply means, transducer means adapted to be associated with said limb at a point more remote from the heart than said cuff for indicating variations in blood pressure in said limb, means for controllably connecting said supply means to said cuff for a length of time sufficient to increase the pressure in said cuff to a value above the systolic pressure to be measured, first normally closed controllable means operative when said supply means is connected to said cuff for connecting said systolic pressure indicating means to said cuff, second normally closed controllable means for connecting said diastolic means to said cuff, circuit means in driven relationship to said transducer for effectively disconnecting said first indicating means from said cuff when said transducer translates a pressure pulse, and second circuit means in driven relationship to said transducer for connecting said second indicating means to said cuff each time said transducer translates a pressure pulse.

3. Apparatus in accordance with claim 2 and further including means for disabling said circuits while said source of fluid is connected to said cuff.

4. Blood pressure measuring apparatus comprising a pressure cuff adapted to be wrapped about a limb and responsive to the admission of fluid under pressure to restrict the flow of blood through the limb, pressure fluid supply means and first controllable valve means for connecting said supply means to said cuff, pressure sensing means, and second controllable valve means for connecting said pressure sensing means to said cuff, transducer means responsive to the presence of a pulse at a point on such limb more remote from the heart than the location of said cuff, means for bleeding said cuff of pressure fluid, timer means for periodically actuating said first valve means to connect said pressure supply means to said cuff and thereafter disconnect the same, circuit means responsive to the translation of a pulse by said transducer means to actuate said second valve means to disconnect said pressure sensing means from said cuff, dump valve means for rapidly releasing the air in said cuff, circuit means responsive to said timer for closing said dump valve means prior to the commencement of blood pressure measurement and opening said dump valve means after blood pressure measurement has been completed, the timer being constructed and arranged to sequentially close said dump valve means, open the valve connecting said pressure supply means to said cuff, and disable said circuit means, and after a first interval, close the valve connecting said pressure supply means to said cuff and reactivate said circuit means, and, after a second interval, open said dump valve means.

5. Blood pressure measuring apparatus comprising a pressure cuff adapted to be wrapped about a limb and responsive to the admission of fluid under pressure to restrict the flow of blood through the limb, a restricted discharge port for bleeding off pressure from said cuff, pressure supply means for inflating said cuff and a timer for connecting the supply means to charge the cuff and for disconnecting the supply means from the cuff, systolic pressure sensing means, a transducer adapted to respond to blood pressure pulses at a point on such limb more remote from the heart than the location of said cuff, and control circuit means for the systolic pressure sensing means operative during bleed-off of pressure from the cuff to connect the pressure sensing means to the cuff and responsive to translation by said transducer of the initial pulse to disconnect the pressure sensing means from the cuff.

6. Blood pressure measuring apparatus comprising a pressure cuff adapted to be wrapped about a limb and responsive to the admission of fluid under pressure to restrict the flow of blood through the limb, a restricted discharge port for bleeding off pressure from said cuff, pressure supply means for inflating said cuff and a timer for connecting the supply means to charge the cuff and for disconnecting the supply means from the cuff, systolic pressure sensing means, diastolic pressure sensing means, a transducer adapted to respond to blood pressure pulses at a point on such limb more remote from the heart than the location of said cuff, and control circuits for the systolic and diastolic pressure sensing means including circuit means operative during bleed off of pressure from the cuff to connect the systolic pressure sensing means to the cuff and responsive to translation by said transducer of the initial pulse to disconnect the systolic pressure sensing means from the cuff, and further including circuit means operative during further bleed off of pressure from the cuff and responsive to translation by said transducer of succeeding pulses to repeatedly connect the diastolic pressure sensing means to the cuff.

7. Blood pressure measuring apparatus comprising a pressure cuff adapted to be wrapped about a limb and to be distended by the admission of a fluid under pressure to restrict the flow of blood through the limb, transducer means responsive to a pulse at a point on such limb more remote from the heart than the location of said cuff, diastolic pressure sensing means connectible to said cuff to sense the pressure of the fluid therein, circuit means responsive to the translation of a pulse by said transducer means to connect said diastolic pressure sensing means to said cuff, systolic pressure sensing means connected to said cuff when distended, and second circuit means responsive to the translation of a pulse by said transducer means to disconnect said systolic pressure sensing means from said cuff.

References Cited in the file of this patent
UNITED STATES PATENTS

| | | |
|---|---|---|
| 2,352,875 | Williams | July 4, 1944 |
| 2,710,001 | Freyburger | June 7, 1955 |
| 2,821,188 | Pigeon | Jan. 28, 1958 |
| 2,827,040 | Gilford | Mar. 18, 1958 |
| 2,865,365 | Newland | Dec. 23, 1958 |
| 2,875,750 | Boucke | Mar. 3, 1959 |